Nov. 20, 1956 M. J. DI TORO 2,771,586

NOISE SUPPRESSION DEVICE

Filed May 20, 1952

INVENTOR
MICHAEL J. DI TORO
BY Percy P. Lantzy
ATTORNEY

United States Patent Office 2,771,586

Patented Nov. 20, 1956

2,771,586

NOISE SUPPRESSION DEVICE

Michael J. Di Toro, Bloomfield, N. J., assignor to International Telephone and Telegraph Corporation, a corporation of Maryland Application May 20, 1952, Serial No. 288,983

3 Claims. (Cl. 333—71)

This invention relates to devices for the suppression of noise accompanying a signal wave, particularly to the suppression of noise present in the entire frequency spectrum of the signal wave.

Noise is a very disagreeable form of distortion occurring in communication systems, and any device which is capable of suppressing noise will ordinarily increase the range of a communication system or conversely allow a decrease in power for the same range, and, therefore, such a noise suppressor is a most important and useful device. Prior art devices have attempted to increase the signal-to-noise ratio by reducing the disturbing effects of noise in various ways. Some of these known devices have attenuated high frequency response of the system, but these devices have required a reduction in the frequency transmission bandwidth in order to obtain any substantial reduction in the noise. Other devices have utilized a number of octave band pass filters to divide the signal into a plurality of frequency bands, and at the output of each octave filter signals below a predetermined level were squelched. At the output of the squelch circuit, filters were again utilized to eliminate any harmonic distortion introduced by the squelch circuit. Such devices were not capable of eliminating intermodulation products. Still other known devices have utilized pre-emphasis at the transmitter and then de-emphasis at the receiver. Such devices were actually "tone controls" and as such were the equivalent of time invariant networks.

None of these known devices for noise suppression utilizes a network whose response characteristics vary with time and accommodates itself to the message present over a certain interval of time. To produce an optimum signal-to-noise ratio of a received speech signal, what is required is a time invariant network whose time of integration does not exceed the time of individual syllables or message sounds. Such a device would cause the power spectrum of the message, and also of the noise present in the received signal, to be a function of time. Since the admittance characteristic of such a filter would be a function of the message and noise power spectra, it too would vary with time causing the output/input characteristic of such a filter to be non-linear. In addition, if the input signal is to be divided into a large plurality of frequency pass bands, the electronic components necessary to perform this function, particularly in the lower frequencies, will occupy a considerable volume and weight.

One of the objects of this invention, therefore, is to provide a noise suppression device which will selectively eliminate noise, to the exclusion of the message, from a received signal.

Another object of this invention is to provide a time varying filter network which will shape its response characteristic to fit the changing spectra of the time varying message components.

A further object of this invention is to provide an electromechanical noise suppression device.

In accordance with a feature of this invention, an electromechanical noise suppression device divides an input audio signal into a plurality of frequency sub-bands by utilizing an electromechanical transducer and a plurality of mechanically resonant circuits and imparts to each sub-band a non-linear dynamic gain characteristic. The output of each sub-band is again filtered and coupled to a common output which yields a noise suppressed signal.

The above-mentioned and other features and objects of this invention will become more apparent by reference to the following description taken in conjunction with the accompanying drawings, in which.

Figure 1:
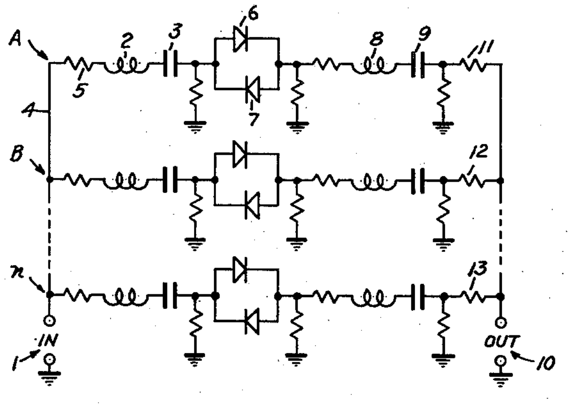
Fig. 1 is a schematic diagram of an electrical noise suppression circuit.

Referring to Fig. 1, an electrical noise suppression circuit in accordance with the principles of this invention is shown wherein for simplicity only three filter channels A, B, and *n* are represented, although it will become evident as this description proceeds that the more filter channels which are used, the narrower the bandwidth of each filter and the greater the improvement in the noise-signal ratio. It is assumed for convenience that an audio signal having an upper frequency limit of 3000 c. p. s. is impressed on the input terminal 1 of the electrical noise suppression circuit. If the total suppression circuit has ten filter channels, each filter would be designed to pass $\frac{1}{10}$ of the input signal's total frequency bandwidth, i. e. 300 cycles. The pass band of each channel is determined by the constants of the resonant circuit comprising inductance 2 and capacitance 3. The input audio signal is coupled via line 4 through the coupling resistor 5 to the resonant circuit of each channel. The frequency filtered output from the resonant circuit is fed to a pair of rectifiers 6 and 7 coupled back to back. The rectifier portion of each channel has a non-linear dynamic gain characteristic which prevails at all regions of the spectrum, but at any one region, it is independent of the characteristic of that in other regions. The desired non-linear dynamic gain characteristic may be obtained by utilizing properly biased diode vacuum tubes or crystal rectifiers. Since the admittance characteristic of each of the filter channels depends upon the power densities of the input message and noise, both of which are functions of time, it too will vary with time. Thus a time varying filter network is contained in each channel due to the non-linear characteristic of the rectifier portion. The individual outputs of each channel will contain undesirable frequency components imposed by the portion of the circuit imparting the non-linear characteristic. To eliminate these spurious responses, the output signal is coupled through a narrow band pass filter comprising inductance 8 and capacitance 9. The filtered output of each channel is fed through coupling resistors 11, 12, and 13 and combined, and the total output from terminal 10 comprises the input signal with the noise portion suppressed.

Figures 2, 3:
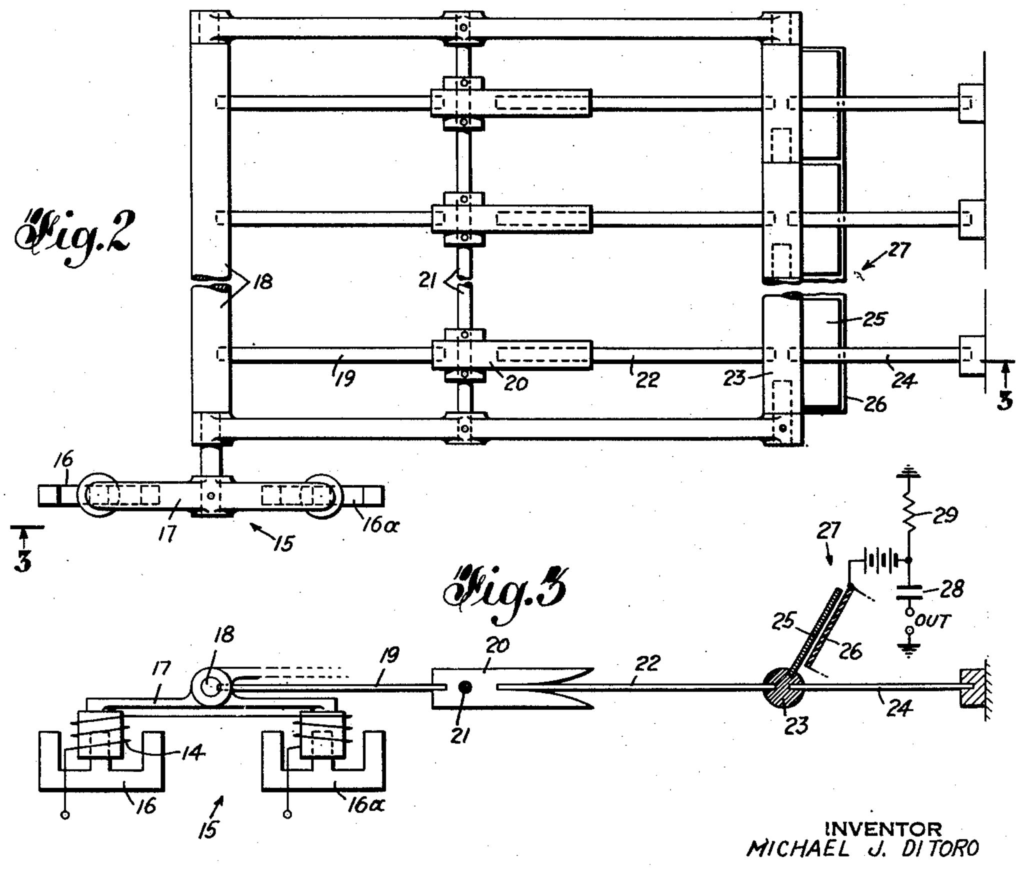
Fig. 2 is a view in elevation of an electromechanical noise suppression circuit.
Fig. 3 is a plan view of one sub-band for use in the circuit of Fig. 2.

Fig. 2 is the electromechanical equivalent of the electrical noise suppression circuit of Fig. 1. In order to convert the electrical energy of the received signal into mechanical energy, some form of electromechanical transducer is required. One of the most common types of electromechanical driving systems in use at the present time is the electromagnetic transducer wherein the mechanical force equivalent of the input electrical signal is developed by the interaction of a magnetic field with an electric current varied in accordance with the input electrical signal. Thus in Fig. 2 the input audio signal is coupled to coil 14 of the electromechanical transducer 15, and the interaction of the electric current in coil 14 with the magnetic fields of magnets 16 and 16a will vary with the input signal, and a mechanical force will be set up causing the coil 14 to return to its electrical mid-point position. As the current in coil 14 varies, the electrical mid position of coil 14 will vary causing a vibratory motion to be imparted to the frame 17 which is rigidly connected to the coil 14. The vibration of frame 17 about a pivot point will be transmitted to shaft 18 whose mechanical angular vibratory motion will be dependent upon the electrical energy of the input signal. The angular motion of shaft 18 is transmitted to a plurality of resonant mechanical compliances 19. The physical properties of each compliance 19 is such that vibrations at its resonant frequency are coupled to the cams 20 while vibrations at frequencies other than resonant will be dampened. Thus the compliances 19 act as the equivalent of the electrical narrow band pass filter.

The desired non-linear dynamic gain characteristic is imparted to the filtered energy output of compliance 19 by means of cam 20 which rotates about an axis 21. The energy from the compliance 19 is imparted to cam 20, whose surfaces are so formed that the filtered energy will have the desired non-linear characteristic imparted to it when it is transmitted from the output of the cam 20 to a second mechanical compliance 22 which acts as a narrow band pass filter to eliminate any spurious frequency responses which may be introduced by cam 20. The output of the second compliance 22 causes the shaft 23 to vibrate with an angular motion. The energy imparted to shaft 23 may be dampened by means of cantilever 24. The output of each sub-band transmitted to shaft 23, causes an electrode 25 to move nearer to or further from an electrode 26 common to all channels varying the capacity of the output condenser 27 comprising the common electrode 26 and the plurality of electrodes 25, one for each sub-band. The common electrode 26 is coupled to a source of D.-C. and the output signal is taken through a coupling condenser 28 across a load resistance 29.

It is known that if the definition of a mechanical impedance is a ratio of force to velocity, then a mass is the mechanical equivalent of an electrical inductance, a compliance is the equivalent of a capacitance, and a mechanical resistance is the equivalent of an electrical resistance. Thus a frequency pass band filter may comprise a vibration reducing circuit having a mass and compliance. At certain frequencies, depending upon the mass and compliance of the vibratory structure, such a circuit transmits more energy than is transmitted at other frequencies. Thus the transforming action of the misterminated filter section can be eliminated by introducing a dampening mechanism which in effect properly terminates the filter. Mechanical band pass filters for use at audio frequencies can utilize a tuned metallic reed, vibrating in flexure. The band pass range of such a tuned reed may be calculated from its mass and compliance. Thus in the device of this invention, the frequency varying motion of shaft 18 is coupled to a plurality of tuned reeds 19 each designed to pass a different band of frequencies. Filter elements having a mechanical motion have a greater advantage over their electrical equivalents in that they have very little energy dissipation associated with their motion, and hence the equivalent mechanical elements have a higher ratio of reactance to resistance, or "Q," which results in a more selective frequency filter from mechanical elements than from electrical elements.

The filtered vibratory motion of the tuned reeds 19 is coupled to a plurality of cams 20. Due to the curved surface of cams 20, the desired non-linear characteristic is imposed on the energy transferred from tuned reeds 19 to tuned reeds 22. The tuned reeds 22 act as band pass filters in a manner identical with the action of tuned reeds 19 heretofore explained. The energy output of tuned reeds 22 is coupled to rotating shafts 23 each individually movable about axle 24 to control the movement of an individual electrode 25 of capacitor 27. The electrode 26 of capacitor 27 is common to all channels of the noise suppression circuit. The varying capacitance of capacitor 27 converts the mechanical motion of each channel into an electrical signal which comprises the received signal with its noise content suppressed.

Due to the fact that in systems of this type, for suppression of noise to the exclusion of the message from a received signal, the electrical elements required are rather large and that their mechanical equivalents can be made rather small, a great reduction in weight and size is obtained when an electromechanical system is utilized in accordance with the principles of this invention.

While I have described above the principles of my invention in connection with specific apparatus, it is to be clearly understood that this description is made only by way of example and not as a limitation to the scope of my invention as set forth in the objects thereof and in the accompanying claims.

I claim:

1. A noise suppression circuit comprising a source of electrical signals having a wide band of frequency, an electromechanical transducer to convert said electrical energy into equivalent mechanical energy, a plurality of bars vibrated in flexure each having a different mass and compliance characteristic to separate said mechanical energy into a plurality of frequency dependent channels, means in each of said channels to couple the energy of each of said channels to a cam having a non-linear surface characteristic, means to couple the energy transmitted to said cam from the non-linear surface of said cam to a second bar in each channel having an individual mass and compliance characteristic, and a mechanical electrical transducer to convert the mechanical energy of said channels into an electrical signal in accordance with the combined total mechanical energy of said channels.

2. A noise suppression circuit for electrical signals having a wide band of frequencies comprising means to convert said electrical energy into equivalent mechanical energy, means to separate said mechanical energy into a plurality of channels having different predetermined frequency sub-bands, means in each channel to impart a non-linear characteristic to the energy transmitted through subject channel comprising a cam having curved surfaces, means to couple said cam to said separating means, and means to couple energy from the curved surface of said cams, means to reduce distortion due to the imparting of the non-linear characteristic in each channel and output means to combine the energy of all channels.

3. A noise suppression circuit for electrical signals having a wide band of frequencies comprising means to convert said electrical energy into equivalent mechanical energy, means to separate said mechanical energy into a plurality of channels having different predetermined frequency sub-bands, means in each channel to impart a non-linear characteristic to the energy transmitted through such channel, means to reduce distortion due to the imparting of the non-linear characteristic in each channel, and output means to combine the energy of all channels including a capacitor having an electrode common to all channels and a plurality of electrodes each responsive to the mechanical energy output of a respective one of said channels whereby the total capacitance of said capacitor will vary responsive to the combined outputs of all of said channels.

(References on following page)

References Cited in the file of this patent

UNITED STATES PATENTS

| | | |
|---|---|---|
| 1,654,123 | Hartley | Dec. 27, 1927 |
| 1,666,681 | Burgess | Apr. 17, 1928 |
| 2,112,560 | Davies | Mar. 29, 1938 |
| 2,163,195 | Edwards | June 20, 1939 |
| 2,164,541 | Och | July 4, 1939 |
| 2,517,819 | Young | Aug. 8, 1950 |
| 2,541,320 | Bachelet | Feb. 13, 1951 |
| 2,575,333 | Di Toro | Nov. 20, 1951 |

FOREIGN PATENTS

| | | |
|---|---|---|
| 738,990 | Germany | Sept. 8, 1943 |

OTHER REFERENCES

Olson, Electronics, vol. 20, No. 12, December 1947, pages 118–122.